(12) United States Patent
Zähe

(10) Patent No.: US 10,570,932 B1
(45) Date of Patent: Feb. 25, 2020

(54) ELECTROHYDRAULIC VALVE NORMALLY OPERATING IN PRESSURE RELIEF MODE AND CONFIGURED TO BLOCK FLUID FLOW WHEN ACTUATED

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

( * ) Notice: Subject to any disclaimer, the term of this patent is extended or adjusted under 35 U.S.C. 154(b) by 45 days.

(21) Appl. No.: 16/133,991

(22) Filed: Sep. 18, 2018

(51) Int. Cl.
| *F15B 13/042* | (2006.01) |
| *F15B 13/044* | (2006.01) |
| *F15B 13/02* | (2006.01) |

(52) U.S. Cl.
CPC ........ *F15B 13/0426* (2013.01); *F15B 13/024* (2013.01); *F15B 13/025* (2013.01); *F15B 13/0442* (2013.01); *Y10T 137/777* (2015.04); *Y10T 137/7766* (2015.04)

(58) Field of Classification Search
CPC .. F15B 13/0426; F15B 13/024; F15B 13/025; F15B 13/0442; Y10T 137/7766; Y10T 137/7769; Y10T 137/777
USPC ...................................... 137/491, 492, 492.5
See application file for complete search history.

(56) References Cited

U.S. PATENT DOCUMENTS

| 4,526,201 | A * | 7/1985 | Geyler, Jr. .......... F15B 13/0403 137/625.63 |
| 4,873,817 | A | 10/1989 | Harms |
| 5,381,823 | A | 1/1995 | DiBartolo |
| 5,836,335 | A | 11/1998 | Harms et al. |
| 6,039,070 | A | 3/2000 | Zähe |
| 6,116,263 | A | 9/2000 | Liberfarb |
| 6,167,906 | B1 | 1/2001 | Liberfarb |
| 6,966,329 | B2 | 11/2005 | Liberfarb |
| 7,779,853 | B2 * | 8/2010 | Reilly ................. F15B 13/0402 137/14 |
| 8,397,758 | B2 * | 3/2013 | Hillesheim ........ G05D 16/2024 137/625.68 |
| 9,273,702 | B2 * | 3/2016 | Grawunde ............ F16K 17/065 |
| 9,322,416 | B2 * | 4/2016 | Bissbort ................ F15B 11/167 |
| 9,850,919 | B2 * | 12/2017 | Zaehe ................... F15B 13/015 |
| 2003/0106588 | A1 | 6/2003 | Zähe |

(Continued)

OTHER PUBLICATIONS

Notice of Allowance and Fees Due issued by the U.S. Patent Office in U.S. Appl. No. 16/133,972, dated Oct. 22, 2019.

*Primary Examiner* — William M McCalister
(74) *Attorney, Agent, or Firm* — McDonnell Boehnen Hulbert & Berghoff LLP

(57) ABSTRACT

An example valve includes: (i) a pilot seat member comprising a first channel and a second channel, a pilot seat, and a pilot sleeve portion comprising a pilot chamber and a cross-hole; (ii) a pilot check member disposed in the pilot chamber and subjected to a biasing force of a setting spring, wherein the pilot check member is configured to be subjected to fluid force of fluid in the second channel; and (iii) a solenoid actuator sleeve slidably accommodated about the pilot sleeve portion, wherein the solenoid actuator sleeve comprises a cross-hole and an annular groove, wherein the cross-hole of the solenoid actuator sleeve is fluidly coupled to a second port of the valve, and the annular groove is configured to selectively fluidly couple the first channel to the second channel based on a position of the solenoid actuator sleeve.

20 Claims, 7 Drawing Sheets

(56) References Cited

U.S. PATENT DOCUMENTS

| | | |
|---|---|---|
| 2003/0131889 A1 | 7/2003 | Kim |
| 2005/0178443 A1 | 8/2005 | Cheong |
| 2006/0201554 A1 | 9/2006 | Prinsen et al. |
| 2006/0266419 A1 | 11/2006 | Krug-Kussius |
| 2012/0305108 A1 | 12/2012 | Jerchen et al. |
| 2016/0091101 A1 | 3/2016 | Neubauer et al. |

* cited by examiner

800

```
┌─────────────────────────────────────────────────────────┐
│ OPERATING A VALVE IN A PRESSURE RELIEF MODE, WHEREIN WHEN│
│ PRESSURE LEVEL OF PRESSURIZED FLUID RECEIVED AT A FIRST  │
│ PORT OF THE VALVE EXCEEDS A PARTICULAR PRESSURE LEVEL,   │
│ THE PRESSURIZED FLUID OVERCOMES A BIASING FORCE OF A     │
│ SETTING SPRING OF THE VALVE, THEREBY CAUSING A PILOT     │
│ CHECK MEMBER TO BE UNSEATED OFF A PILOT SEAT MEMBER      │
│ AND OPENING A PILOT FLOW PATH VIA: (I) A FIRST RADIAL    │
│ CHANNEL AND A SECOND RADIAL CHANNEL FORMED IN THE PILOT  │— 802
│ SEAT MEMBER AND FLUIDLY COUPLED TO EACH OTHER BY AN      │
│ ANNULAR GROOVE DISPOSED IN AN INTERIOR PERIPHERAL        │
│ SURFACE OF A SOLENOID ACTUATOR SLEEVE, AND (II)          │
│ CROSS-HOLES OF A PILOT SLEEVE PORTION OF THE PILOT SEAT  │
│ MEMBER, WHICH ARE ALIGNED WITH CROSS-HOLES OF THE        │
│ SOLENOID ACTUATOR SLEEVE, TO ALLOW PILOT FLOW FROM       │
│ THE FIRST PORT TO A SECOND PORT                          │
└─────────────────────────────────────────────────────────┘
                            │
                            ▼
┌─────────────────────────────────────────────────────────┐
│ IN RESPONSE TO PILOT FLOW THROUGH THE PILOT FLOW PATH,   │
│ CAUSING A PISTON TO MOVE, THEREBY ALLOWING MAIN FLOW     │— 804
│ FROM THE FIRST PORT TO THE SECOND PORT                   │
└─────────────────────────────────────────────────────────┘
                            │
                            ▼
┌─────────────────────────────────────────────────────────┐
│ RECEIVING AN ELECTRIC SIGNAL ENERGIZING A SOLENOID COIL  │
│ OF A SOLENOID ACTUATOR OF THE VALVE TO SWITCH THE VALVE  │— 806
│ TO A FLOW-BLOCKING MODE OF OPERATION                     │
└─────────────────────────────────────────────────────────┘
                            │
                            ▼
┌─────────────────────────────────────────────────────────┐
│ RESPONSIVELY, CAUSING AN ARMATURE AND THE SOLENOID       │
│ ACTUATOR SLEEVE COUPLED TO THE ARMATURE TO MOVE,         │
│ THEREBY MOVING THE ANNULAR GROOVE OUT OF ALIGNMENT       │
│ WITH THE FIRST RADIAL CHANNEL, CAUSING THE FIRST RADIAL  │— 808
│ CHANNEL TO BE BLOCKED, PRECLUDING THE PILOT FLOW PATH    │
│ FROM FORMING, AND BLOCKING FLUID AT THE FIRST PORT       │
└─────────────────────────────────────────────────────────┘
```

FIG. 8

ELECTROHYDRAULIC VALVE NORMALLY OPERATING IN PRESSURE RELIEF MODE AND CONFIGURED TO BLOCK FLUID FLOW WHEN ACTUATED

BACKGROUND

A relief valve or pressure relief valve (PRV) is a type of safety valve used to control or limit the pressure in a system. Pressure might otherwise build up and can cause equipment failure. The pressure is relieved by allowing the pressurized fluid to flow out of the system to a tank or low pressure fluid reservoir. In some applications, a PRV can be used to build pressure level of fluid up to a particular pressure level to operate a hydraulic system or component.

A PRV is designed or set to open at a predetermined setting pressure to protect other components and other equipment from being subjected to pressures that exceed their design limits. When the setting pressure is exceeded, the PRV becomes or forms the "path of least resistance" as the PRV is forced open and a portion of fluid is diverted to the tank. As the fluid is diverted, the pressure inside the system stops rising. Once the pressure is reduced and reaches the PRV's reseating pressure, the PRV closes.

SUMMARY

The present disclosure describes implementations that relate to an electrohydraulic valve normally operating in pressure relief mode and configured to block fluid flow when actuated.

In a first example implementation, the present disclosure describes a valve. The valve includes: (i) a pilot seat member comprising: (a) a first channel and a second channel, wherein the first channel is fluidly coupled to a first port of the valve, (b) a pilot seat, and (c) a pilot sleeve portion comprising a pilot chamber and a cross-hole disposed in an exterior peripheral surface of the pilot sleeve portion; (ii) a pilot check member disposed in the pilot chamber and subjected to a biasing force of a setting spring disposed in the pilot chamber, wherein the biasing force acts in a distal direction to seat the pilot check member at the pilot seat, wherein the pilot check member is configured to be subjected to fluid force of fluid in the second channel of the pilot seat member acting on the pilot check member in a proximal direction; and (iii) a solenoid actuator sleeve slidably accommodated about the exterior peripheral surface of the pilot sleeve portion of the pilot seat member, wherein the solenoid actuator sleeve comprises a cross-hole disposed in an exterior peripheral surface of the solenoid actuator sleeve and an annular groove disposed in an interior peripheral surface of the solenoid actuator sleeve, wherein the cross-hole of the solenoid actuator sleeve is fluidly coupled to a second port of the valve. When the valve is unactuated: (i) the cross-hole of the solenoid actuator sleeve is aligned with the cross-hole of the pilot sleeve portion, and (ii) the annular groove fluidly couples the second channel to the first channel to enable generation of pilot flow from the first port to the second port when the fluid force overcomes the biasing force and the pilot check member is unseated. When the valve is actuated, the solenoid actuator sleeve and the annular groove move axially, thereby causing the second channel to be fluidly decoupled from the first channel and precluding pilot flow from the first port to the second port.

In a second example implementation, the present disclosure describes a hydraulic system including a source of fluid; a reservoir; and a valve having a first port fluidly coupled to the source of fluid, and a second port fluidly coupled to the reservoir. The valve comprises: (i) a pilot seat member comprising: (a) a first channel and a second channel, wherein the first channel is fluidly coupled to the first port of the valve, (b) a pilot seat, and (c) a pilot sleeve portion comprising a pilot chamber and a cross-hole disposed in an exterior peripheral surface of the pilot sleeve portion; (ii) a pilot check member disposed in the pilot chamber and subjected to a biasing force of a setting spring disposed in the pilot chamber, wherein the biasing force acts in a distal direction to seat the pilot check member at the pilot seat, wherein the pilot check member is configured to be subjected to fluid force of fluid in the second channel of the pilot seat member acting on the pilot check member in a proximal direction; and (iii) a solenoid actuator sleeve slidably accommodated about the exterior peripheral surface of the pilot sleeve portion of the pilot seat member, wherein the solenoid actuator sleeve comprises a cross-hole disposed in an exterior peripheral surface of the solenoid actuator sleeve and an annular groove disposed in an interior peripheral surface of the solenoid actuator sleeve, wherein the cross-hole of the solenoid actuator sleeve is fluidly coupled to the second port of the valve. When the valve is unactuated: (i) the cross-hole of the solenoid actuator sleeve is aligned with the cross-hole of the pilot sleeve portion, and (ii) the annular groove fluidly couples the second channel to the first channel to enable generation of pilot flow from the first port to the second port when the fluid force overcomes the biasing force and the pilot check member is unseated. When the valve is actuated, the solenoid actuator sleeve and the annular groove move axially, thereby causing the second channel to be fluidly decoupled from the first channel and precluding pilot flow from the first port to the second port.

In a third example implementation, the present disclosure describes a valve. The valve includes: (i) a housing having a longitudinal cylindrical cavity therein and having a cross-hole disposed in an exterior peripheral surface of the housing; (ii) a main sleeve disposed, at least partially, in the longitudinal cylindrical cavity of the housing, wherein the main sleeve includes a first port at a distal end of the main sleeve and includes one or more cross-holes disposed on an exterior peripheral surface of the main sleeve, wherein the cross-hole of the housing and the one or more cross-holes of the main sleeve form a second port; (iii) a piston disposed within the main sleeve and configured to be axially movable therein, wherein the piston comprises a main chamber therein, and wherein the main chamber is fluidly coupled to the first port via an orifice; (v) a pilot seat member comprising: (a) a first channel and a second channel, wherein the first channel is fluidly coupled to the first port, (b) a pilot seat, and (c) a pilot sleeve portion comprising a pilot chamber and a cross-hole disposed in an exterior peripheral surface of the pilot sleeve portion; (vi) a pilot check member disposed in the pilot chamber and subjected to a biasing force of a setting spring disposed in the pilot chamber, wherein the biasing force acts in a distal direction to seat the pilot check member at the pilot seat, wherein the pilot check member is configured to be subjected to fluid force of fluid in the second channel of the pilot seat member acting on the pilot check member in a proximal direction; and (vii) a solenoid actuator sleeve slidably accommodated about the exterior peripheral surface of the pilot sleeve portion of the pilot seat member, wherein the solenoid actuator sleeve comprises a cross-hole disposed in an exterior peripheral surface of the solenoid actuator sleeve and an annular groove disposed in an interior peripheral surface of the solenoid actuator sleeve, wherein the cross-hole of the solenoid actuator sleeve is fluidly coupled to the second port of the valve, and wherein the annular groove is configured to selectively fluidly couple the first channel to the second channel based on a position of the solenoid actuator sleeve.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 8 is a flowchart of a method for operating a valve, in accordance with an example implementation.

DETAILED DESCRIPTION

Pressure relief valves are configured to open at a preset pressure and discharge fluid until pressure drops to acceptable levels in a system. In operation, the pressure relief valve can remain normally-closed until pressure upstream reaches a desired setting pressure. The valve can then "crack" open when the setting pressure is reached, and continue to open further, allowing more flow as pressure increases. When upstream pressure falls below the setting pressure, the valve can close again.

In some examples, it may be desirable to have a pressure relief valve that can be normally operating in a pressure relief mode to prevent pressure levels in the system from exceeding the setting pressure combined with the ability to block fluid flow from a source of fluid (e.g., a pump) and divert the fluid to another hydraulic component at high pressure when actuated via an actuation signal (e.g., with an electrical signal). For example, the valve may operate in a flow-blocking mode when actuated to provide or divert flow to a hydraulic motor at a high pressure level (e.g., 5000 pounds per square inch (psi)) so as to accelerate the hydraulic motor or provide high initial torque. Once the hydraulic motor reaches a desired speed, the valve can be unactuated to provide a pressure relief setting that is less than such high pressure level. For instance, the pressure relief setting can be between 1000 and 3000 psi). This way, the valve allows fluid to be provided to the hydraulic motor at a lower pressure level to maintain its speed.

It may also be desirable to have such combined functionality in a compact package that does not involve using several valves, but rather a single valve that combines multiple functionalities, thereby reducing manufacturing cost. Further, having a compact package that performs multiple functionalities reduces system size and weight.

Disclosed herein is a valve configured to normally operate in a pressure relief mode where the valve operates as a relief valve and forms a pilot flow path configured to allow fluid flow therethrough when a relief setting (i.e., the setting pressure) is reached. Upon actuation, the valve is configured to preclude the pilot flow path from forming and operate in a flow-blocking mode to block fluid flow from the source through the valve. Un-actuating the valve enables the pilot flow path to form and renders the valve operating as a relief valve again.

Figure 1:
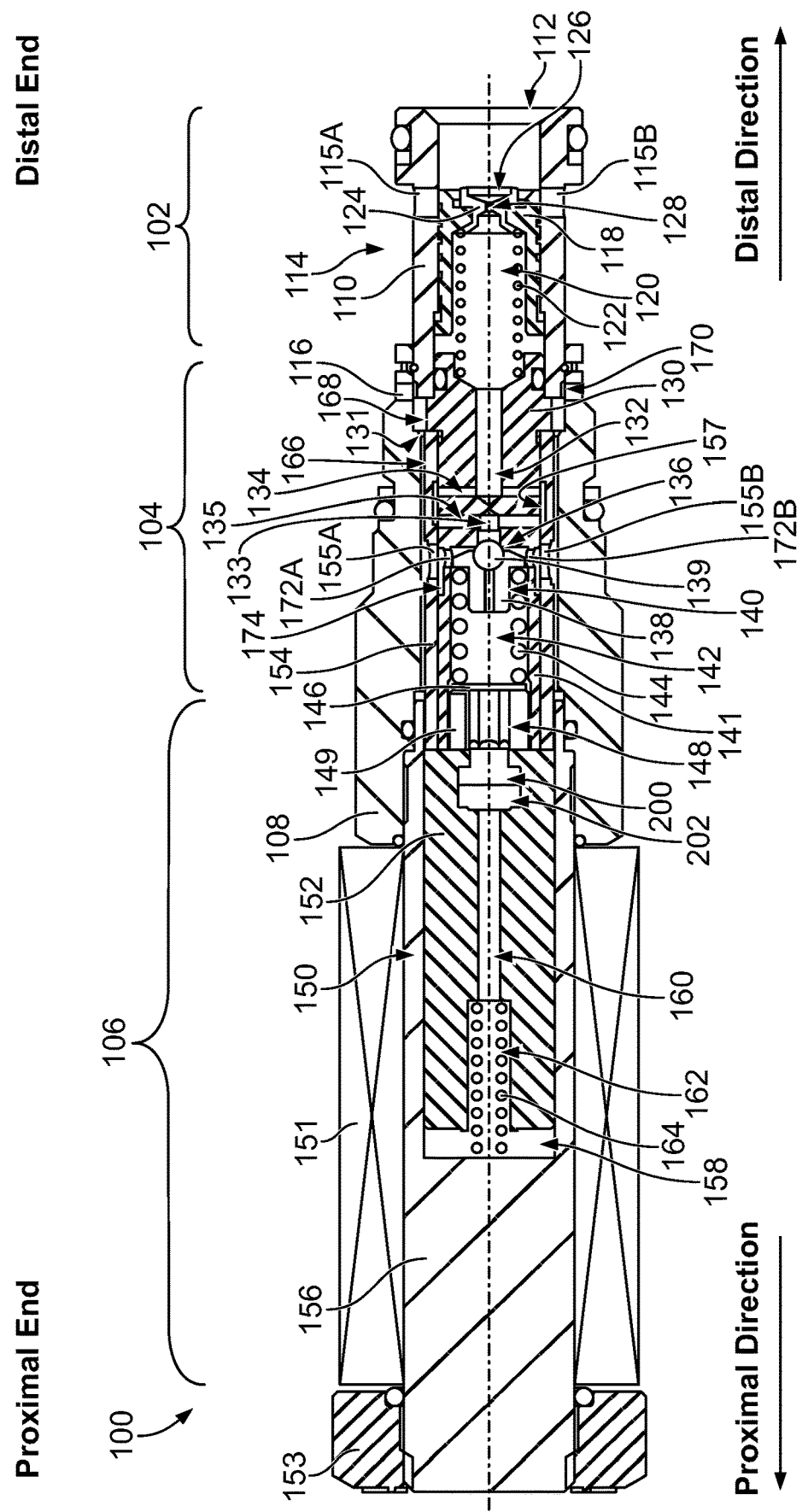
FIG. 1 illustrates a cross-sectional side view of a valve in a pressure relief mode, in accordance with an example implementation.

FIG. 1 illustrates a cross-sectional side view of a valve 100 in a pressure relief operation mode, in accordance with an example implementation. The valve 100 may be inserted or screwed into a manifold having ports corresponding to ports of the valve 100 described below, and can thus fluidly coupled the valve 100 to other components of a hydraulic system.

The valve 100 may include a main stage 102, a pilot stage 104, and a solenoid actuator 106. The valve 100 includes a housing 108 that includes a longitudinal cylindrical cavity therein. The longitudinal cylindrical cavity of the housing 108 is configured to house portions of the main stage 102, the pilot stage 104, and the solenoid actuator 106.

The main stage 102 includes a main sleeve 110 received at a distal end of the housing 108, and the main sleeve 110 is coaxial with the housing 108. The valve 100 includes a first port 112 and a second port 114. The first port 112 is defined at a nose or distal end of the main sleeve 110. The second port 114 can include a first set of cross-holes that can be referred to as main flow cross-holes, such as main flow cross-holes 115A, 115B, disposed in a radial array about an exterior surface of the main sleeve 110. The second port 114 can also include a second set of cross-holes that can be referred to as pilot flow cross-holes, such as pilot flow cross-hole 116 disposed in the housing 108.

The main sleeve 110 includes a respective longitudinal cylindrical cavity therein. The valve 100 includes a piston 118 that is disposed, and slidably accommodated, in the longitudinal cylindrical cavity of the main sleeve 110. The term "piston" is used herein to encompass any type of movable element, such as a spool-type movable element or a poppet-type movable element. The piston 118 is shown in the figures as a spool-type movable element; however, it is contemplated that a poppet-type movable element can be used instead. In the case a poppet-type movable element is used, the inner peripheral surface of the main sleeve 110 can form a protrusion that operates as a seat for the poppet-type movable element and reduce leakage through the valve 100.

Further, the term "slidably accommodated" is throughout herein to indicate that a first component (e.g., the piston 118) is positioned relative to a second component (e.g., the main sleeve 110) with sufficient clearance therebetween, enabling movement of the first component relative to the second component in the proximal and distal directions. As such, the first component (e.g., piston 118) is not stationary, locked, or fixedly disposed in the valve 100, but rather, is allowed to move relative to the second component (e.g., the main sleeve 110).

The piston 118 has a cavity or main chamber 120 therein, and the valve 100 includes a main spring 122 disposed in the main chamber 120 of the piston 118. The valve 100 also includes a ring-shaped member 124 disposed, at least partially, within the piston 118 at a distal end thereof. The ring-shaped member 124 includes a filter 126 and forms therein an orifice 128 that fluidly couples the first port 112 to the main chamber 120.

The valve 100 further includes a pilot seat member 130 fixedly disposed at the proximal end of in the main sleeve 110 within the cavity of the housing 108. As shown in FIG. 1, the pilot seat member 130 has a shoulder formed by an exterior peripheral surface of the pilot seat member 130. The shoulder interfaces with the proximal end of the main sleeve 110 and interfaces with a shoulder 131 formed as a protrusion from an interior peripheral surface of the housing 108. As such, the pilot seat member 130 is fixedly disposed within the housing 108.

The main spring 122 is disposed in the main chamber 120 such that a distal end of the main spring 122 rests against the interior surface of the piston 118, and a proximal end of the main spring 122 rests against the pilot seat member 130. The pilot seat member 130 is fixed, and thus the main spring 122 biases the piston 118 in the distal direction (to the right in FIG. 1). The distal direction could also be referred to as a closing direction. The main spring 122 is configured as a weak spring (e.g., a spring with a spring rate of 8 pound-force/inch causing a 2 pound-force biasing force on the piston 118). With such a low spring rate, a low pressure level differential across the piston 118, e.g., pressure level differential of 25 psi, can cause the piston 118 to move in the proximal direction against the biasing force of the main spring 122.

Further, the pilot seat member 130 includes a plurality of channels. For example, the pilot seat member 130 can include a first longitudinal channel 132 and a second longitudinal channel 133. The pilot seat member 130 can also include a plurality of radial channels such as a first radial channel 134 fluidly coupled to the first longitudinal channel 132 and a second radial channel 135 fluidly coupled to the second longitudinal channel 133. The first radial channel 134 is axially spaced apart from the second radial channel 135 along a length of the pilot seat member 130.

The pilot seat member 130 forms a pilot seat 136 at a proximal end of the second longitudinal channel 133. The pilot stage 104 of the valve 100 includes a pilot poppet 138 configured to be seated at the pilot seat 136. In particular, with the configuration shown in FIG. 1, the pilot poppet 138 forms a cavity at its distal end that is configured to house a pilot check ball 139. When the valve 100 is in the pressure relief mode of operation depicted in FIG. 1, the pilot check ball 139 is configured to be seated at the pilot seat 136 until pressure level at the first port 112 exceeds a pressure setting of the valve 100 as described below.

The pilot poppet 138 and the pilot check ball 139 can be collectively referred to as a pilot check member 140. The configuration of the pilot check member 140 that includes the pilot poppet 138 and the pilot check ball 139 as shown in FIG. 1 is an example for illustration. In other examples, a pilot check member can be configured as a poppet having a nose section that tapers gradually, such that rather than using a check ball to block fluid flow, an exterior surface of the nose section of the poppet is seated at the pilot seat 136 to block fluid flow.

As show in FIG. 1, the pilot seat member 130 has a pilot sleeve portion 141 that extends in the proximal direction within the housing 108 and forms therein a pilot chamber 142 in which the pilot poppet 138 is disposed and is slidably accommodated therein. The pilot poppet 138 is thus guided by an interior peripheral surface of the pilot sleeve portion 141 when the pilot poppet 138 moves axially in a longitudinal direction.

The pilot stage 104 further includes a setting spring 144 disposed in the pilot chamber 142, such that a distal end of the setting spring 144 interfaces with the pilot poppet 138 and biases the pilot poppet 138 toward the pilot seat 136. As such, the pilot poppet 138 operates as a distal spring cap for the setting spring 144.

A proximal end of the setting spring 144 rests against a washer 146 disposed in the pilot chamber 142 and fixed in place via a spring preload adjustment screw 148. The spring preload adjustment screw 148 has a threaded region on its exterior peripheral surface that threadedly engages with a corresponding threaded region on an interior peripheral surface of the pilot sleeve portion 141 of the pilot seat member 130.

The valve 100 can further include a pin 149 that secures that spring preload adjustment screw 148 within the pilot sleeve portion 141. For example, the pin 149 can be disposed partially within a longitudinal groove formed in the exterior peripheral surface of the spring preload adjustment screw 148 and partially within a longitudinal groove formed in the interior exterior peripheral surface of the pilot sleeve portion 141. As such, the pin 149 couples and secures the spring preload adjustment screw 148 to the pilot sleeve portion 141. In an example, the pin 149 can be pushed into the longitudinal groove formed on the exterior peripheral of the spring preload adjustment screw 148, and as the pin 149 is forced in longitudinal groove, it deforms interior threads of the pilot sleeve portion 141. As such, once the spring preload adjustment screw 148 is screwed into the pilot seat member 130 to a particular longitudinal or axial position, and the pin 149 is inserted, positions of the spring preload adjustment screw 148 and the washer 146 are fixed, as the spring preload adjustment screw 148 can no longer rotate relative to the pilot seat member 130.

The biasing force of the setting spring 144 determines the pressure relief setting of the valve 100, where the pressure relief setting is the pressure level of fluid at the first port 112 at which the valve 100 can open to relieve fluid to the second port 114. Specifically, based on a spring rate of the setting spring 144 and the length of the setting spring 144, the setting spring 144 exerts a particular preload or biasing force on the pilot poppet 138 in the distal direction, thus causing the pilot check ball 139 to be seated at the pilot seat 136 of the pilot seat member 130. The pressure relief setting of the valve 100 can be determined by dividing the biasing force that the setting spring 144 applies to the pilot poppet 138 by an effective area of the pilot seat 136. The effective area of the pilot seat 136 can be estimated as a circular area having a diameter of the pilot seat 136. As an example for illustration, the pressure relief setting of the valve 100 can be about 3000 psi.

As described below, when the valve 100 is unactuated as depicted in FIG. 1 and when pressure level of fluid at the first port 112 causes the fluid to apply a fluid force on the pilot check ball 139, and thus on the pilot poppet 138, in the proximal direction that overcomes the biasing force of the setting spring 144 applied on the pilot poppet 138 in the distal direction, the pilot poppet 138 and the pilot check ball 139 move off the pilot seat 136. As the pilot check ball 139 is unseated, a pilot flow is allowed, thereby causing main flow from the first port 112 to the second port 114 and relieving the fluid as described below. As a result, the hydraulic system that includes the valve 100 is protected from pressure levels exceeding the setting pressure of the valve 100.

Adjusting longitudinal position of the spring preload adjustment screw 148 within the pilot seat member 130

(prior to installation of the pin 149) can adjust the biasing force of the setting spring 144. For example, if the spring preload adjustment screw 148 is rotated in a first direction (e.g., in a clockwise direction), the spring preload adjustment screw 148 may move axially in the distal direction (e.g., to the right in FIG. 1) pushing the washer 146 in the distal direction, thus compressing the setting spring 144 and increasing the preload or biasing force of the setting spring 144.

Conversely, rotating the spring preload adjustment screw 148 in a second direction (e.g., counter-clockwise) causes the spring preload adjustment screw 148 to move axially in the proximal direction, allowing the setting spring 144 to push the washer 146 in the proximal direction. The length of the setting spring 144 thus increases and the preload or biasing force of the setting spring 144 is reduced.

In examples, the spring preload adjustment screw 148 can be hollow such that a force sensor (e.g., a pin configured to have a force sensor coupled thereto) can be inserted from the proximal end of the valve 100 (prior to installation of the solenoid actuator 106) through the spring preload adjustment screw 148 to contact the washer 146 and measure the biasing force of the setting spring 144. With this configuration, if desired, the biasing force of the setting spring 144, and thus the pressure relief setting of the valve 100, can be adjusted by adjusting the longitudinal or axial position of the spring preload adjustment screw 148, prior to completing assembly of the valve 100 (i.e., prior to installation of the pin 149 and the solenoid actuator 106).

The solenoid actuator 106 includes a solenoid tube 150 configured as a cylindrical housing or body disposed within and received at a proximal end of the housing 108, such that the solenoid tube 150 is coaxial with the housing 108. For instance, the solenoid tube 150 can have a threaded region disposed on an exterior peripheral surface at a distal end thereof that threadedly engages with a corresponding threaded region formed on an interior peripheral surface of the housing 108 at a proximal end thereof. A solenoid coil 151 can be disposed about an exterior surface of the solenoid tube 150. The solenoid coil 151 is retained between a proximal end of the housing 108 and a coil nut 153 having internal threads that can engage a threaded region formed on the exterior peripheral surface of the solenoid tube 150 at its proximal end.

The solenoid tube 150 forms therein a solenoid actuator chamber configured to house a plunger or armature 152. The armature 152 is slidably accommodated within the solenoid tube 150 (i.e., the armature 152 can move axially within the solenoid tube 150).

The solenoid actuator 106 further includes a solenoid actuator sleeve 154 received at the proximal end of the housing 108 and also disposed partially within a distal end of the solenoid tube 150. The solenoid actuator sleeve 154 is slidably accommodated about the exterior peripheral surface of the pilot sleeve portion 141 (i.e., the solenoid actuator sleeve 154 is positioned relative to the pilot sleeve portion 141 with sufficient clearance therebetween, enabling movement of the solenoid actuator sleeve 154 relative to the pilot sleeve portion 141 in the proximal and distal directions, and thus the solenoid actuator sleeve 154 is not stationary, locked, or fixedly disposed in the valve 100, but rather, is allowed to move relative to the pilot sleeve portion 141).

Further, the solenoid actuator sleeve 154 includes a set of cross-holes, such as cross-holes 155A, 155B, disposed in a radial array about an exterior surface of the solenoid actuator sleeve 154 and configured to communicate fluid therethrough. The solenoid actuator sleeve 154 also includes an annular groove 157 disposed in an interior peripheral surface of the solenoid actuator sleeve 154. The annular groove 157 is configured to selectively fluidly couple the first radial channel 134 to the second radial channel 135 based on an axial position of the solenoid actuator sleeve 154.

In the state shown in FIG. 1, where the valve 100 operates in the pressure relief mode, the annular groove 157 partially overlaps the first radial channel 134 and partially overlaps the second radial channel 135. With this configuration, the annular groove 157 forms an axially extending flow passage that fluidly couples the first radial channel 134 (which is fluidly coupled to the first longitudinal channel 132) to the second radial channel 135 (which is fluidly coupled to the second longitudinal channel 133). In this manner, fluid received at the first port 112 can be communicated through the orifice 128, the main chamber 120, the first longitudinal channel 132, the first radial channel 134, the annular groove 157, the second radial channel 135, and the second longitudinal channel 133 to the pilot check ball 139.

Further, the armature 152 is mechanically coupled to, or linked with, the solenoid actuator sleeve 154. As such, if the armature 152 moves axially (e.g., in the proximal direction), the solenoid actuator sleeve 154 moves along with the armature 152 in the same direction.

Figure 2:
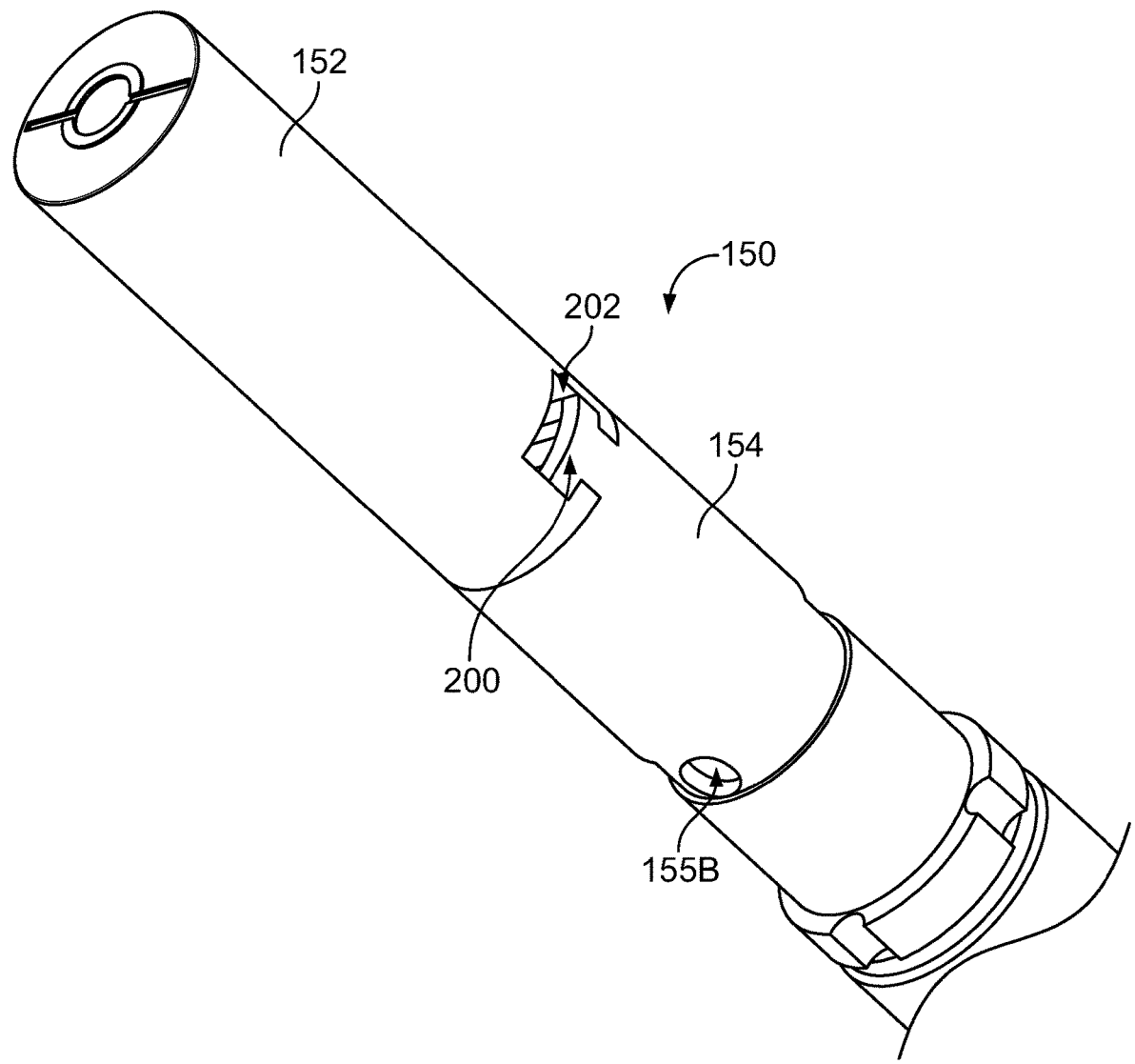
FIG. 2 illustrates a three-dimensional perspective view showing an armature coupled to a solenoid actuator sleeve, in accordance with an example implementation.

The armature 152 can be coupled to the solenoid actuator sleeve 154 in several ways. FIG. 2 illustrates a three-dimensional partial perspective view showing the armature 152 coupled to the solenoid actuator sleeve 154, in accordance with an example implementation. As shown, the solenoid actuator sleeve 154 can have a male T-shaped member 200, and the armature 152 can have a corresponding female T-slot 202 configured to receive the male T-shaped member 200 of the solenoid actuator sleeve 154. With this configuration, the armature 152 and the solenoid actuator sleeve 154 are coupled to each other, such that if the armature 152 moves, the solenoid actuator sleeve 154 moves therewith.

Referring back to FIG. 1, the solenoid tube 150 further includes a pole piece 156 that can be separated from the armature 152 by an airgap 158. The pole piece 156 can be composed of material of high magnetic permeability.

The armature 152 includes therein a channel 160 and a chamber 162 formed within the armature 152 at a proximal end thereof. The chamber 162 is thus bounded by an interior surface of the pole piece 156 and an interior surface of the armature 152. As such, fluid received at the first port 112 can be communicated through unsealed spaces within the valve 100 to the channel 160, then to the chamber 162 and the airgap 158. With this configuration, the armature 152 can be pressure-balanced with fluid acting on both its proximal and distal ends.

Further, in examples, the chamber 162 can house a solenoid spring 164 that biases the armature 152 toward the solenoid actuator sleeve 154 and the pilot sleeve portion 141 such that there is no axial clearance or axial "play" between the armature 152, the solenoid actuator sleeve 154, and the pilot sleeve portion 141, thus maintaining contact therebetween, when the valve 100 is unactuated. When the valve 100 is actuated, as described below, the armature 152 can move in the proximal direction against the force of the solenoid spring 164, and thus the solenoid actuator sleeve 154 can move relative to (e.g., slide about the exterior peripheral surface of) the pilot sleeve portion 141, which is fixed. The solenoid spring 164 can be a weak spring that applies a low force on the armature 152. As an example for illustration, the solenoid spring 164 can have a spring rate of 30 pound-force/inch causing a force of about 2.5 pound-force on the armature 152).

As shown in FIG. 1, an exterior diameter of the solenoid actuator sleeve 154 is smaller than an interior diameter of the housing 108, and thus annular space 166 is formed therebetween. Also, the pilot seat member 130 includes a plurality of longitudinal channels or through-holes such as longitudinal through-hole 168 disposed in a radial array around the pilot seat member 130. Further, the longitudinal through-hole 168 is fluidly coupled to the pilot flow cross-hole 116 of the housing 108 via an annular undercut or annular groove 170 formed on the exterior peripheral surface of the main sleeve 110 at a proximal end thereof.

Further, the pilot sleeve portion 141 includes cross-holes, such as cross-holes 172A, 172B disposed in a radial array about the pilot sleeve portion 141. The cross-holes 172A, 172B are fluidly coupled to an annular groove 174 formed in an exterior peripheral surface of the pilot sleeve portion 141.

The valve 100 is configured to operate in at least two modes of operation. The first mode of operation, when the valve 100 is unactuated, can be referred to as the pressure relief mode of operation. In this mode of operation, the valve 100 can allow pressure level of fluid in the system (e.g., at the first port 112) to increase, but not exceed the pressure setting of the valve 100, which is determined by the setting spring 144.

In the pressure relief mode of operation, as shown in FIG. 1, the solenoid actuator sleeve 154 is in a first position, where the annular groove 157 operates as an axially extending flow passage that fluidly couples the first radial channel 134 (which is fluidly coupled to the first longitudinal channel 132) to the second radial channel 135 (which is fluidly coupled to the second longitudinal channel 133). Further, when the solenoid actuator sleeve 154 is in the first position, the cross-holes 155A, 155B are aligned, or partially overlap, with the annular groove 174 of the pilot sleeve portion 141.

With this configuration and position of the solenoid actuator sleeve 154, fluid at the first port 112 is communicated to the pilot check ball 139 and the pilot poppet 138 through the orifice 128, the main chamber 120, the first longitudinal channel 132, the first radial channel 134, the annular groove 157, the second radial channel 135, and the second longitudinal channel 133. When pressure level of the fluid at the first port 112, which is communicated to the pilot check ball 139 and pilot poppet 138, reaches or exceeds a predetermined setting pressure determined by the setting spring 144, fluid pushes the pilot check ball 139 and the pilot poppet 138 in the proximal direction (to the left in FIG. 1) off the pilot seat 136. As mentioned above, the predetermined setting pressure is determined by dividing a preload force that the setting spring 144 applies to the pilot poppet 138 by the effective area of the pilot seat 136 (e.g., the circular area having the diameter of the pilot seat 136, which can be slightly larger than the diameter the second longitudinal channel 133). As an example for illustration, the pilot check ball 139 and the pilot poppet 138 can move a distance of about 0.05 inches off the pilot seat 136.

As a result of the pilot check ball 139 and the pilot poppet 138 being unseated, a pilot flow path is formed and pilot fluid flow is generated from the first port 112 to the second port 114. Particularly, fluid at the first port 112 can flow through the orifice 128, the main chamber 120, the first longitudinal channel 132, the first radial channel 134, the annular groove 157, the second radial channel 135, and the second longitudinal channel 133 to within the pilot sleeve portion 141 (e.g., the pilot chamber 142) then through the cross-hole 172A, 172B, the annular groove 174, the cross-holes 155A, 155B, the annular space 166, the longitudinal through-hole 168, the annular groove 170, and the pilot flow cross-hole 116 to the second port 114. Such fluid flow from the first port 112 to the second port 114 through the pilot flow cross-hole 116 can be referred to as the pilot flow. As an example for illustration, the pilot flow can amount to about 0.15 gallons per minute (GPM).

The pilot flow through the orifice 128, which operates as a flow restriction, causes a pressure drop in the pressure level of the fluid. Thus, the pressure level of fluid in the main chamber 120 becomes lower than the pressure level of fluid received at the first port 112. As a result, fluid at the first port 112 applies a force on the distal end of the piston 118 in the proximal direction (e.g., to the left in FIG. 1) that is larger than the force applied by fluid in the main chamber 120 on the proximal end of the piston 118 in the distal direction (e.g., to the right in FIG. 1).

Due to such force imbalance on the piston 118, a net force is applied to the piston 118 in the proximal direction. When the net force overcomes the biasing force of the main spring 122 on the piston 118, the net force causes the piston 118 to move or be displaced axially in the proximal direction against the biasing force of the main spring 122. As mentioned above, the main spring 122 has a low spring rate, and thus a small pressure drop (e.g., when the pressure drop across the orifice 128 is about 25 psi) can cause the net force to overcome the biasing force of the main spring 122 on the piston 118.

Axial movement of the piston 118 in the proximal direction past edges of the main flow cross-holes 115A, 115B, causes the main flow cross-holes 115A, 115B to be exposed, thereby forming a main flow path to allow main flow directly from the first port 112 through the main flow cross-holes 115A, 115B to the second port 114. Such direct flow from the first port 112 to the second port 114 can be referred to as the main flow. As an example for illustration, the main flow rate can amount to up to 25 GPM based on the pressure setting of the valve 100 and the pressure drop between the first port 112 and the second port 114. The 25 GPM main flow rate is an example for illustration only. The valve 100 is scalable in size and different amounts of main flow rates can be achieved.

The second port 114 can be coupled to a low pressure reservoir or tank having fluid at low pressure level (e.g., atmospheric or low pressure level such as 10-70 psi). As such, pressurized fluid at the first port 112 is relieved to the tank through the second port 114, thereby precluding pressure level at the first port 112 from increasing further and protecting the hydraulic system from high pressure levels.

The valve 100 is further configured to operate in a second mode of operation when the valve 100 is actuated. The second mode of operation can be referred to as the flow-blocking mode of operation.

Figure 3:
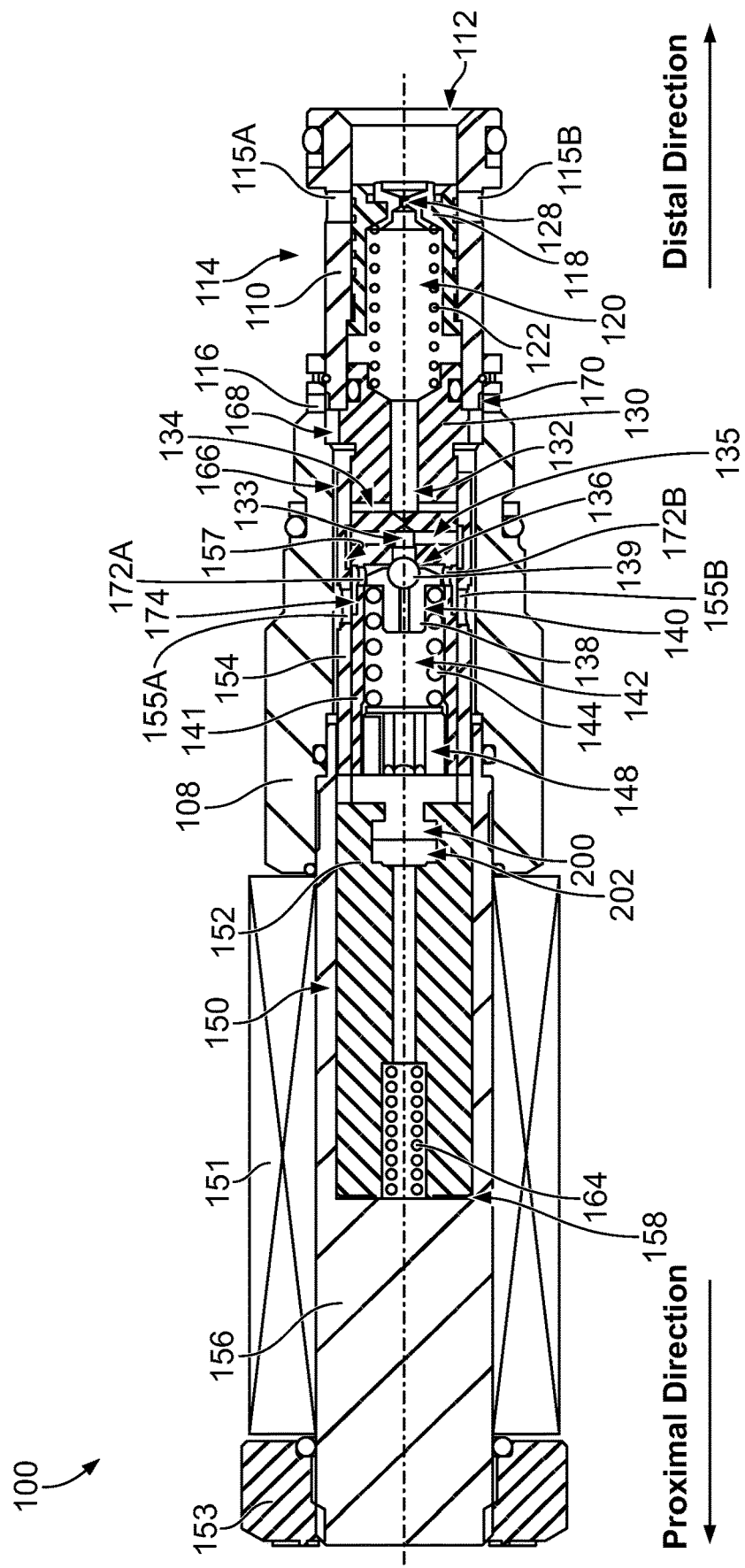
FIG. 3 illustrates a cross-sectional side view of a valve in a flow-blocking mode of operation, in accordance with another example implementation.

FIG. 3 illustrates a cross-sectional side view of the valve 100 in a flow-blocking mode of operation, in accordance with an example implementation. When an electric current is provided through the windings of the solenoid coil 151, a magnetic field is generated. The pole piece 156 directs the magnetic field through the airgap 158 toward the armature 152, which is movable and is attracted toward the pole piece 156. In other words, when an electric current is applied to the solenoid coil 151, the generated magnetic field forms a north and south pole in the pole piece 156 and the armature 152, and therefore the pole piece 156 and the armature 152 are attracted to each other. Because the pole piece 156 is fixed and the armature 152 is movable, the armature 152 can traverse the airgap 158 toward the pole piece 156, and the airgap 158 is reduced in size as depicted in FIG. 3. As such, a solenoid force is applied on the armature 152, where the solenoid force is a pulling force that tends to pull the armature 152 in the proximal direction against the force of the solenoid spring 164.

The solenoid force applied to the armature 152 is also applied to the solenoid actuator sleeve 154, which is coupled to the armature 152 as described with respect to FIG. 2. As the solenoid actuator sleeve 154 moves in the proximal direction (to the left in FIG. 3) to a second position shown in FIG. 3, the annular groove 157 of the solenoid actuator sleeve 154 moves out of alignment, and no longer overlaps, with the first radial channel 134 of the pilot seat member 130. As a result, the first radial channel 134 is blocked, and the annular groove 157 no longer fluidly couples the first radial channel 134 to the second radial channel 135. In other words, the second radial channel 135 is fluidly decoupled from the first radial channel 134.

As such, in the flow-blocking mode of operation, when the valve 100 is actuated (i.e., when the solenoid coil 151 is energized), the pilot flow path is blocked, as fluid at the first port 112 is not communicated from the first radial channel 134 to the second radial channel 135. In other words, actuating the valve 100 precludes the pilot flow path from forming as fluid is not communicated to the second radial channel 135, and is thus not communicated to the pilot check ball 139.

Due to pilot flow path being blocked, no pilot flow is generated through the orifice 128, and no pressure drop occurs thereacross. The piston 118 thus remains pressure-balanced based on fluid forces, and the main spring 122 biases the piston 118 in the distal direction, thereby blocking the main flow cross-holes 115A, 115B, and blocking main flow from the first port 112 to the second port 114.

If the solenoid coil 151 is de-energized, the valve 100 reverts back to the pressure relief mode of operation described above with respect to FIG. 1, where the annular groove 157 fluidly couples the first radial channel 134 to the second radial channel 135, and the pilot flow path can form when the pressure level at the first port 112 exceeds the pressure setting of the valve 100. However, as long as the pressure level at the first port 112 is less than the pressure setting of the valve 100, flow from the first port 112 to the second port 114 through the orifice 128, the main chamber 120, the first longitudinal channel 132, the first radial channel 134, the annular groove 157, the second radial channel 135, and the second longitudinal channel 133 is blocked at the pilot check ball 139. As a result, no pressure drop occurs across the orifice 128, and the piston 118 is pressure-balanced due to the pressure level of fluid at the first port 112 and within the main chamber 120 being substantially the same. The main spring 122 thus biases the piston 118 in the distal direction to block the main flow cross-holes 115A, 115B and preclude fluid flow from the first port 112 to the second port 114. In this manner, the valve 100 can allow pressure level at the first port 112 to increase. If the pressure level exceeds the pressure setting of the valve 100, the pilot check ball 139 is unseated, and the pilot flow path is formed, thereby relieving the fluid at the first port 112 as described above with respect to FIG. 1.

The valve 100 can be referred to as a fixed setting pressure relief valve because once the preload of the setting spring 144 is set by the location of the spring preload adjustment screw 148 and the solenoid actuator 106 is installed, the preload of the setting spring 144 and its biasing force cannot be changed without disassembling the valve 100. In some applications, it may be desirable to have a manual adjustment actuator coupled to the valve so as to allow for manual modification of the preload of the setting spring 144, and thus modification of the pressure relief setting on the valve, while the valve is installed in the hydraulic system without disassembling the valve.

Figure 4:
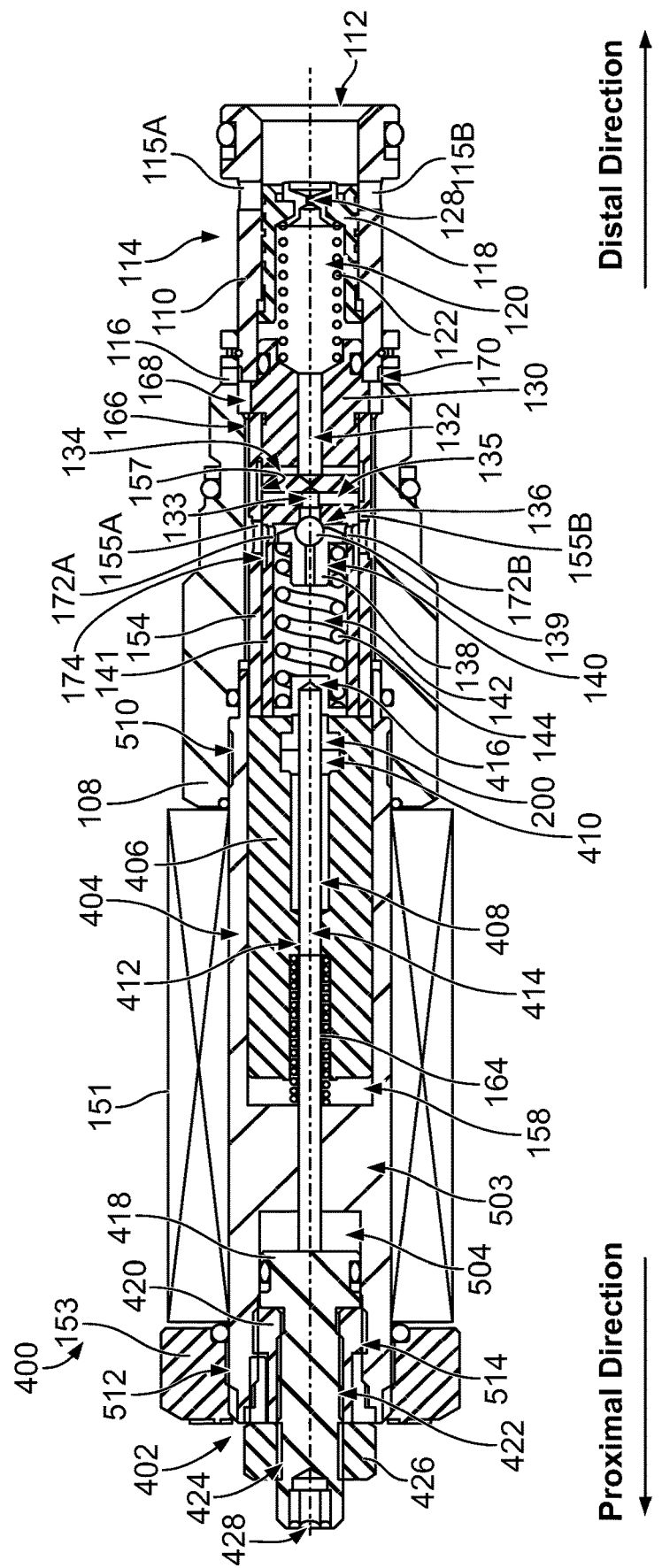
FIG. 4 illustrates a cross-section side view of a valve having a manual adjustment actuator, in accordance with an example implementation.

FIG. 4 illustrates a cross-section side view of a valve 400 having a manual adjustment actuator 402, in accordance with an example implementation. Identical components of both valves 100, 400 are designated with the same reference numbers. The valve 400 includes a solenoid tube 404 that differs from the solenoid tube 150 in that the solenoid tube 404 has a two-chamber configuration that allows it to receive the manual adjustment actuator 402.

Figure 5:
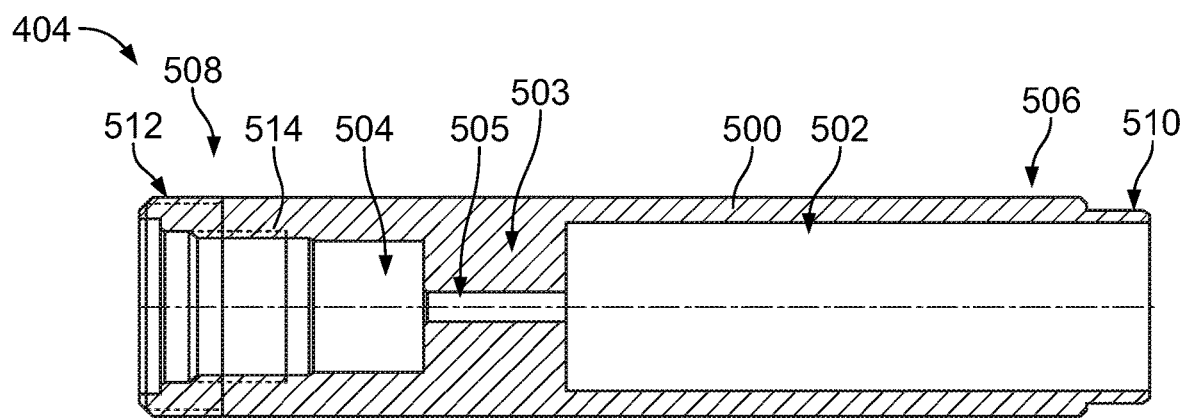
FIG. 5 illustrates a cross-sectional side view of a solenoid tube, in accordance with an example implementation.

FIG. 5 illustrates a cross-sectional side view of the solenoid tube 404, in accordance with an example implementation. As depicted, the solenoid tube 404 has a cylindrical body 500 having therein a first chamber 502 within a distal side of the cylindrical body 500 and a second chamber 504 within a proximal side of the cylindrical body 500. The solenoid tube 404 includes a pole piece 503 formed as a protrusion from an interior peripheral surface of the cylindrical body 500. The pole piece 503 separates the first chamber 502 from the second chamber 504. In other words, the pole piece 503 divides a hollow interior of the cylindrical body 500 into the first chamber 502 and the second chamber 504. The pole piece 503 can be composed of material of high magnetic permeability.

Further, the pole piece 503 defines a channel 505 therethrough. In other words, an interior peripheral surface of the solenoid tube 404 at or through the pole piece 503 forms the channel 505, which fluidly couples the first chamber 502 to the second chamber 504. As such, pressurized fluid provided to the first chamber 502 is communicated through the channel 505 to the second chamber 504.

In examples, the channel 505 can be configured to receive a pin therethrough so as to transfer linear motion of one component in the second chamber 504 to another component in the first chamber 502 and vice versa. As such, the channel 505 can include chamfered circumferential surfaces at its ends (e.g., an end leading into the first chamber 502 and another end leading into the second chamber 504) to facilitate insertion of such a pin therethrough.

The solenoid tube 404 has a distal end 506 configured to be coupled to the housing 108 and a proximal end 508 configured to be coupled to and receive the manual adjustment actuator 402. Particularly, the solenoid tube 404 can have a first threaded region 510 disposed on an exterior peripheral surface of the cylindrical body 500 at the distal end 506 that is configured to threadedly engage with corresponding threads formed in the interior peripheral surface of the housing 108.

Also, the solenoid tube 404 can have a second threaded region 512 disposed on the exterior peripheral surface of the cylindrical body 500 at the proximal end 508 and configured to be threadedly engage with corresponding threads formed in the interior peripheral surface of the coil nut 153. Further, the solenoid tube 404 can have a third threaded region 514 disposed on an interior peripheral surface of the cylindrical body 500 at the proximal end 508 and configured to threadedly engage with corresponding threads formed in a component of the manual adjustment actuator 402 as described below. The solenoid tube 404 can also have one or more shoulders formed in the interior peripheral surface of the cylindrical body 500 that can mate with respective shoulders of the manual adjustment actuator 402 to enable alignment of the manual adjustment actuator 402 within the solenoid tube 404.

Referring back to FIG. 4, the solenoid tube 404 is configured to house an armature 406 in the first chamber 502. The armature 406 has a longitudinal channel 408 formed therein. The armature 406 also includes an annular internal groove or T-slot 410 configured to receive the male T-shaped member 200 of the solenoid actuator sleeve 154. The armature 406 further includes a protrusion 412 from its interior peripheral surface. The solenoid spring 164 is configured to rest on the protrusion 412 to bias the armature 406 in the distal direction.

As mentioned above, the solenoid tube 404 includes the pole piece 503 formed as a protrusion from the interior peripheral surface of the solenoid tube 404. The pole piece 503 is separated from the armature 406 by the airgap 158.

The manual adjustment actuator 402 is configured to allow for adjusting the pressure relief setting of the valve 400 without disassembling the valve 400. The manual adjustment actuator 402 includes a pin 414 disposed through the channel 505. The pin 414 is coupled to a spring cap 416 that interfaces with the setting spring 144 of the valve 400. As such, the valve 400 differs from the valve 100 in that, rather than the setting spring 144 interfacing with the spring preload adjustment screw 148, which is fixed once screwed to a particular position, the valve 400 includes the spring cap 416, which is movable via the pin 414 and can adjust the length of the setting spring 144.

The manual adjustment actuator 402 includes an adjustment piston 418 that interfaces with or contacts the pin 414, such that axial motion of the adjustment piston 418 causes the pin 414 and the spring cap 416 coupled thereto to move axially therewith. The adjustment piston 418 can be threadedly coupled to a nut 420 at threaded region 422. The nut 420 in turn is threadedly coupled to the solenoid tube 404 at the threaded region 514. As such, the adjustment piston 418 is coupled to the solenoid tube 404 via the nut 420. Further, the adjustment piston 418 is threadedly coupled at threaded region 424 to another nut 426.

The adjustment piston 418 is axially movable within the second chamber 504 of the solenoid tube 404. For instance, the adjustment piston 418 can include an adjustment screw 428, such that if the adjustment screw 428 is rotated in a first rotational direction (e.g., clockwise) the adjustment piston 418 moves in the distal direction (e.g., to the right in FIG. 4) by engaging more threads of the threaded regions 422, 424. If the adjustment screw 428 is rotated in a second rotational direction (e.g., counter-clockwise) the adjustment piston 418 is allowed to move in the proximal direction (e.g., to the left in FIG. 4) by disengaging some threads of the threaded regions 422, 424.

While the distal end of the setting spring 144 is coupled to or rests against the pilot poppet 138, the proximal end of the setting spring 144 rests against the spring cap 416, which is coupled to the adjustment piston 418 via the pin 414. As such, axial motion of the adjustment piston 418 results in a change in the length of the setting spring 144. As a result, the biasing force that the setting spring 144 exerts on the pilot poppet 138, and thus the pressure relief setting of the valve 400, is changed. With this configuration, the pressure relief setting of the valve 400 can be adjusted via the manual adjustment actuator 402 without disassembling the valve 400. As an example for illustration, the adjustment piston 418 can have a stroke of about 0.15 inches, which corresponds to a pressure relief setting range between 0 psi and 5000 psi.

The valve 400 is depicted in FIG. 4 in the pressure relief operation mode (similar to the valve 100 in FIG. 1). Similar to the valve 100, the valve 400 can be switched to the flow-blocking operation mode by energizing the solenoid coil 151 so as to move the armature 406 and the solenoid actuator sleeve 154 in the proximal direction (e.g., to the left in FIG. 4).

As described above, as a result of the solenoid actuator sleeve 154 moving in the proximal direction, the annular groove 157 of the solenoid actuator sleeve 154 moves out of alignment, and no longer overlaps, with the first radial channel 134 of the pilot seat member 130, and thus no longer fluidly couples the first radial channel 134 to the second radial channel 135, and fluid is not communicated to second longitudinal channel 133 and the pilot check ball 139. The valve 400 thus switches to the flow-blocking mode of operation, precluding the pilot flow path from forming, and blocking fluid at the first port 112.

The configurations and components shown in FIGS. 1-5 are examples for illustration, and different configurations and components could be used. For example, components can be integrated into a single component or a component can be divided into multiple components. As another example, different types of springs could be used, and other components could be replaced by components that perform a similar functionality. Further, although the solenoid actuator 106 is shown and described as a pull-type solenoid actuator, in other example implementations the valve 100, 400 can be configured such that a push-type solenoid actuator can be used, where the armature 152, 406 can be pushed in the distal direction when the solenoid coil 151 is energized.

The valves 100, 400 can be referred to as pressure relief valves that are switchable to operating as flow-blocking valves. Particularly, the valve 100 or 400 can be included in hydraulic systems so as to operate in a pressure relief mode to build pressure in the hydraulic system and protect the hydraulic system against undesirable increases in pressure level when the valve is unactuated, and switch to a flow-blocking mode to block fluid at the first port 112 and preclude fluid flow through the valve 100, 400 when the valve is actuated.

Figure 6:
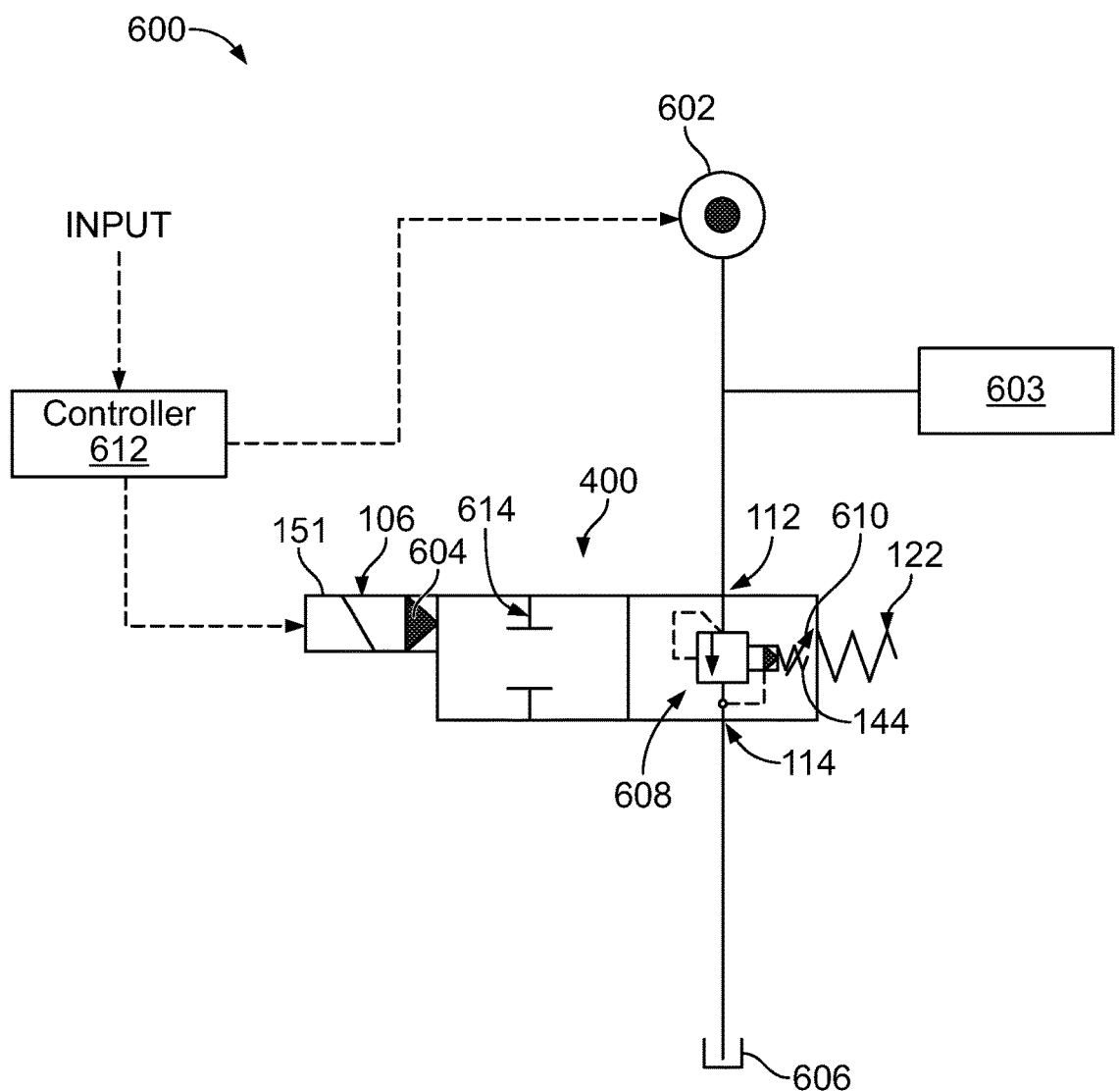
FIG. 6 illustrates a hydraulic circuit using the valve shown in FIG. 4, in accordance with an example implementation.

FIG. 6 illustrates a hydraulic system 600 using the valve 400, in accordance with an example implementation. The valve 400 is depicted symbolically in FIG. 6.

The hydraulic system 600 includes a source 602 of fluid. The source 602 of fluid can, for example, be a pump configured to provide fluid to the first port 112 of the valve 400. Such pump can be a fixed displacement pump, a variable displacement pump, or a load-sensing variable displacement pump, as examples. Additionally or alternatively, the source 602 of fluid can be an accumulator or another component (e.g., a valve) of the hydraulic system 600, such that the source 602 is fluidly coupled to the first port 112 of the valve 400.

As described above, when the valve 400 is unactuated, the valve 400 operates in a pressure relief mode. In the pressure relief mode, pressure level of fluid provided by the source 602 is allowed to build up or increase without exceeding a particular pressure level, thus providing pressurized fluid to other portions, components, equipment, or actuators of the hydraulic system 600. Such other portions, components, equipment, or actuators are represented in FIG. 6 by block 603. For instance, the block 603 can represent a hydraulic motor along with other components. When the valve 400 operates in the pressure relief mode, fluid from the source 602 is diverted to the hydraulic motor at a pressure level that does not exceed the pressure setting of the valve 400 so as to, for example, maintain a particular speed of the hydraulic motor.

If the pressure level of fluid supplied by the source 602 exceeds the pressure setting of the valve 400, such that pressurized fluid at the first port 112 applies a fluid force on the pilot check ball 139 that overcomes the biasing force of the setting spring 144, pressurized fluid unseats the pilot check ball 139 and the pilot flow path is opened. Opening the pilot flow path allows pilot flow, symbolized by arrow 604 in FIG. 6, from the first port 112 to the second port 114 through the orifice 128, the main chamber 120, the first longitudinal channel 132, the first radial channel 134, the annular groove 157, the second radial channel 135, and the second longitudinal channel 133 to within the pilot sleeve portion 141, then through the cross-hole 172A, 172B, the annular groove 174, the cross-holes 155A, 155B, the annular space 166, the longitudinal through-hole 168, the annular groove 170, and the pilot flow cross-hole 116. The pilot flow allows the piston 118 to move, thereby allowing main flow from the first port 112 to the second port 114 via the main flow cross-holes 115A, 115B and relieving fluid at the first port 112 to the second port 114, which can be coupled to a tank 606. The pressure relief mode is represented by symbol 608 in FIG. 6. This way, the speed of the hydraulic motor might not increase beyond a particular speed.

As depicted symbolically in FIG. 6 by arrow 610, the biasing force of the setting spring 144 can be adjusted (e.g., via the manual adjustment actuator 402 as described above). The valve 100 can be used in the hydraulic system 600 instead of the valve 400; however, the valve 100 can be depicted without the arrow 610.

The hydraulic system 600 can further include a controller 612. The controller 612 can include one or more processors or microprocessors and may include data storage (e.g., memory, transitory computer-readable medium, non-transitory computer-readable medium, etc.). The data storage may have stored thereon instructions that, when executed by the one or more processors of the controller 612, cause the controller 612 to perform operations described herein. Signal lines to and from the controller 612 are depicted as dashed lines in FIG. 6. The controller 612 can receive input or input information comprising sensor information via signals from various sensors or input devices in the hydraulic system 600, and in response provide electric signals to various components of the hydraulic system 600.

The controller 612 can receive a command or input information to switch the valve 400 from operating in a pressure relief mode to a flow-blocking operation mode. For example, the controller 612 may receive an input or sensor information indicating a request to operate the valve 400 in a flow-blocking mode to provide or divert flow at a high pressure level (e.g., 5000 psi) to the hydraulic motor.

In response to the command or input information requesting or indicating the mode switch, the controller 612 can send a command signal to the solenoid coil 151 of the solenoid actuator 106 of the valve 400 to generate a solenoid force on the armature 406. When the solenoid force overcomes the biasing force of the solenoid spring 164, the armature 406 and the solenoid actuator sleeve 154 move in the proximal direction as described above. As a result, the annular groove 157 no longer overlaps with the first radial channel 134, and the pilot flow path might not form. As such, fluid at the first port 112 is blocked by the valve 400. Blocking fluid at the first port 112 and precluding it from flowing to the second port 114 is symbolized by blocked fluid path symbol 614 in FIG. 6.

When the valve 400 operates in the flow-blocking mode, fluid from the source 602 is blocked at the first port 112 of the valve 400 and diverted to the block 603, e.g., the hydraulic motor, at the high pressure level so as to accelerate the hydraulic motor or provide high torque. The hydraulic system 600 can include another relief valve (e.g., within the block 603) that can preclude the pressure level from increasing beyond a maximum pressure level to protect the hydraulic system 600.

Figure 7:
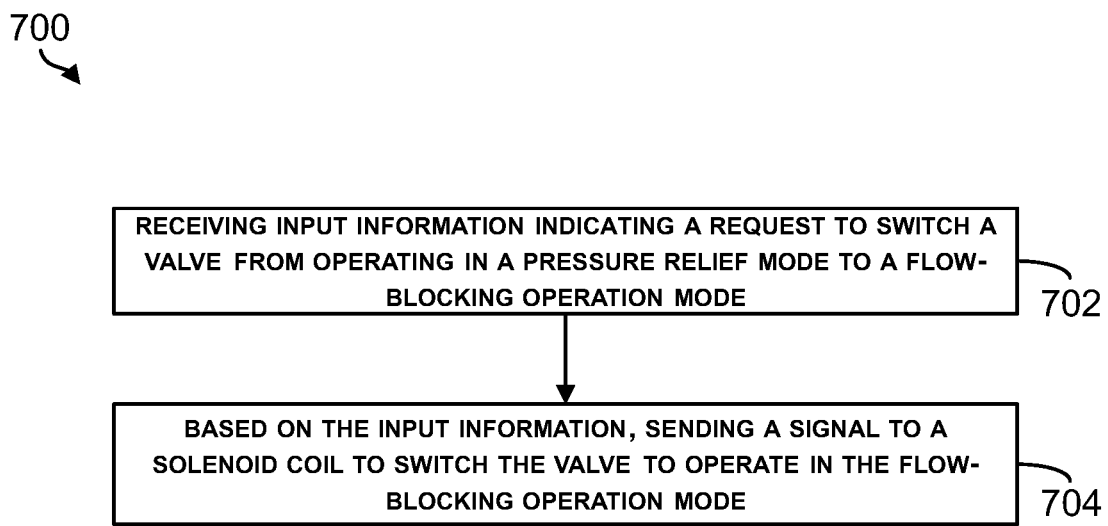
FIG. 7 is a flowchart of a method for controlling a hydraulic system, in accordance with an example implementation.

FIG. 7 is a flowchart of a method 700 for controlling a hydraulic system, in accordance with an example implementation. The method 700 can, for example, be performed by a controller such as the controller 612 to control the hydraulic system 600.

The method 700 may include one or more operations, or actions as illustrated by one or more of blocks 702-704. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 700 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 700 and other processes and operations disclosed herein, one or more blocks in FIG. 7 may represent circuitry or digital logic that is arranged to perform the specific logical operations in the process.

At block 702, the method 700 includes receiving input information indicating a request to switch the valve 100, 400 from operating in a pressure relief mode to a flow-blocking operation mode. The valve 100, 400 is normally operating in the pressure relief mode as described above with respect to FIGS. 1 and 4 when the valve 100, 400 is unactuated.

At block 704, the method 700 includes, based on the input information, sending a signal to the solenoid coil 151 to switch the valve 100, 400 to operate in the flow-blocking operation mode. As described above, the controller 612 can provide a signal to the solenoid coil 151 to cause the armature 152, 406 to apply a force on the solenoid actuator sleeve 154 in the proximal direction, such that as the solenoid actuator sleeve 154 moves, the valve 100, 400 is switched to operating in the flow-blocking mode as described above.

FIG. 8 is a flowchart of a method 800 for operating a valve, in accordance with an example implementation. The method 800 shown in FIG. 8 presents an example of a method that could be used with the valves 100, 400, shown throughout the Figures, for example. The method 800 may include one or more operations, functions, or actions as illustrated by one or more of blocks 802-808. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 802, the method 800 includes operating the valve 100, 400 in a pressure relief mode, wherein when pressure level of pressurized fluid received at the first port 112 of the valve 100, 400 exceeds a particular pressure level (i.e., the pressure relief setting), the pressurized fluid overcomes a biasing force of the setting spring 144 of the valve 100, 400, thereby causing the pilot check member 140 to be unseated off the pilot seat member 130 and opening the pilot flow path via: (i) the first radial channel 134 and the second radial channel 135 formed in the pilot seat member 130 and fluidly coupled to each other by the annular groove 157 disposed in the interior peripheral surface of the solenoid actuator sleeve 154, and (ii) the cross-holes 172A, 172B of the pilot sleeve portion 141 of the pilot seat member 130, which are aligned with the cross-holes 155A, 155B of the solenoid actuator sleeve 154, to allow pilot flow from the first port 112 to the second port 114.

At block 804, the method 800 includes, in response to pilot flow through the pilot flow path, causing the piston 118 to move (i.e., in the proximal direction), thereby allowing main flow from the first port 112 to the second port 114.

At block 806, the method 800 includes receiving an electric signal (e.g., from the controller 612) energizing the solenoid coil 151 of a solenoid actuator (e.g., the solenoid actuator 106) of the valve 100, 400 to switch the valve 100, 400 to a flow-blocking mode of operation. The controller 612 can receive a request to switch the valve 100, 400 to a flow-blocking mode to block fluid at the first port 112. In response, the controller 612 sends the electric signal to the solenoid coil 151 to energize it.

At block 808, the method 800 includes, responsively, causing the armature 152, 406 and the solenoid actuator sleeve 154 coupled to the armature 152, 406 to move, thereby moving the annular groove 157 out of alignment with the first radial channel 134, causing the first radial channel 134 to be blocked, precluding the pilot flow path from forming, and blocking fluid at the first port 112.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A valve comprising:
   a pilot seat member comprising: (i) a first channel and a second channel, wherein the first channel is fluidly coupled to a first port of the valve, (ii) a pilot seat, and (iii) a pilot sleeve portion comprising a pilot chamber and a cross-hole disposed in an exterior peripheral surface of the pilot sleeve portion;
   a pilot check member disposed in the pilot chamber and subjected to a biasing force of a setting spring disposed in the pilot chamber, wherein the biasing force acts in a distal direction to seat the pilot check member at the pilot seat, wherein the pilot check member is configured to be subjected to a fluid force of fluid in the second channel of the pilot seat member acting on the pilot check member in a proximal direction; and
   a solenoid actuator sleeve slidably accommodated about the exterior peripheral surface of the pilot sleeve portion of the pilot seat member, wherein the solenoid actuator sleeve comprises a cross-hole disposed in an exterior peripheral surface of the solenoid actuator sleeve and an annular groove disposed in an interior peripheral surface of the solenoid actuator sleeve, wherein the cross-hole of the solenoid actuator sleeve is fluidly coupled to a second port of the valve, and wherein: when the valve is unactuated: (i) the cross-hole of the solenoid actuator sleeve is aligned with the cross-hole of the pilot sleeve portion, and (ii) the annular groove fluidly couples the second channel to the first channel to enable generation of pilot flow from the first port to the second port when the fluid force overcomes the biasing force and the pilot check member is unseated, and when the valve is actuated, the solenoid actuator sleeve and the annular groove move axially, thereby causing the second channel to be fluidly decoupled from the first channel and precluding pilot flow from the first port to the second port.

2. The valve of claim 1, wherein when the valve is unactuated: (i) the annular groove forms an axially extending flow passage that overlaps, at least partially, the first channel and the second channel of the pilot seat member to fluidly couple the second channel to the first channel, and
when the valve is actuated, the annular groove moves out of alignment with the first channel, thereby causing the second channel to be fluidly decoupled from the first channel and precluding pilot flow from the first port to the second port.

3. The valve of claim 1, wherein:
when the valve is unactuated and when the fluid force overcomes the biasing force of the setting spring on the pilot check member, the pilot check member is unseated and a pilot flow path is formed to allow pilot flow from the first port to the second port through the first channel, the annular groove, the second channel, the cross-hole of the pilot sleeve portion, and the cross-hole of the solenoid actuator sleeve, thereby causing a piston to move axially and open a main flow path from the first port to the second port to relieve fluid from the first port to the second port, and
when the valve is actuated, the annular groove of the solenoid actuator sleeve moves out of alignment with the first channel, thereby blocking the first channel and precluding the pilot flow path from forming.

4. The valve of claim 1, further comprising:
a housing having a longitudinal cylindrical cavity therein and having a cross-hole disposed in an exterior peripheral surface of the housing; and
a main sleeve disposed, at least partially, in the longitudinal cylindrical cavity of the housing, wherein the main sleeve includes the first port at a distal end of the main sleeve and includes one or more cross-holes disposed on an exterior peripheral surface of the main sleeve, wherein the cross-hole of the housing and the one or more cross-holes of the main sleeve form the second port.

5. The valve of claim 4, further comprising:
a piston disposed within the main sleeve and configured to be axially movable therein, wherein the piston comprises a main chamber therein, and wherein the main chamber is fluidly coupled to the first port and the first channel of the pilot seat member.

6. The valve of claim 5, wherein the first channel is a first radial channel and the second channel is a second radial channel axially spaced apart from the first radial channel, and wherein the pilot seat member further comprises: (i) a first longitudinal channel fluidly coupled to the main chamber and the first radial channel, and (ii) a second longitudinal channel fluidly coupled to the second radial channel, wherein the pilot seat is formed at a proximal end of the second longitudinal channel.

7. The valve of claim 6, wherein when the valve is unactuated and when the fluid force overcomes the biasing force of the setting spring on the pilot check member, the pilot check member is unseated and a pilot flow path is formed to allow pilot flow from the first port to the second port, wherein the pilot flow path comprises: the first longitudinal channel, the first radial channel, the annular groove, the second radial channel, the second longitudinal channel, the cross-hole of the pilot sleeve portion, and the cross-hole of the solenoid actuator sleeve.

8. The valve of claim 7, wherein the pilot flow path further comprises (i) an annular space formed between an exterior peripheral surface of the solenoid actuator sleeve and an interior peripheral surface of the housing, (ii) a longitudinal through-hole formed in the pilot seat member, and (iii) the cross-hole of the housing.

9. The valve of claim 1, further comprising:
a solenoid actuator comprising a solenoid coil, a pole piece, and an armature that is mechanically coupled to the solenoid actuator sleeve, such that when the solenoid coil is energized, the armature and the solenoid actuator sleeve coupled thereto are pulled axially toward the pole piece, thereby moving the annular groove out of alignment with the first channel to fluidly decouple the second channel from the first channel and block the first channel.

10. The valve of claim 9, wherein the armature comprises a T-slot formed as an annular internal groove, wherein the solenoid actuator sleeve comprises a male T-shaped member, and wherein the T-slot of the armature is configured to receive the male T-shaped member of the solenoid actuator sleeve to mechanically couple the armature to the solenoid actuator sleeve.

11. The valve of claim 9, wherein the solenoid actuator further comprises a solenoid tube, and wherein the solenoid tube comprises: (i) a cylindrical body, (ii) a first chamber defined within the cylindrical body and configured to receive the armature of the solenoid actuator therein, and (iii) a second chamber defined within the cylindrical body, wherein the pole piece is formed as a protrusion from an interior peripheral surface of the cylindrical body, wherein the pole piece is disposed between the first chamber and the second chamber, and wherein the pole piece defines a channel therethrough, such that the channel fluidly couples the first chamber to the second chamber.

12. The valve of claim 11, further comprising:
a manual adjustment actuator having: (i) an adjustment piston disposed, at least partially, in the second chamber of the solenoid tube, (ii) a pin disposed through the channel of the pole piece and through the armature, wherein a proximal end of the pin contacts the adjustment piston and a distal end of the pin is coupled to a spring cap against which a proximal end of the setting spring rests, such that axial motion of the adjustment piston causes the pin and the spring cap coupled thereto to move axially, thereby adjusting the biasing force of the setting spring.

13. A hydraulic system comprising:
a source of fluid;
a reservoir; and
a valve having a first port fluidly coupled to the source of fluid, and a second port fluidly coupled to the reservoir, wherein the valve comprises:

a pilot seat member comprising: (i) a first channel and a second channel, wherein the first channel is fluidly coupled to the first port of the valve, (ii) a pilot seat, and (iii) a pilot sleeve portion comprising a pilot chamber and a cross-hole disposed in an exterior peripheral surface of the pilot sleeve portion, a pilot check member disposed in the pilot chamber and subjected to a biasing force of a setting spring disposed in the pilot chamber, wherein the biasing force acts in a distal direction to seat the pilot check member at the pilot seat, wherein the pilot check member is configured to be subjected to fluid force of fluid in the second channel of the pilot seat member acting on the pilot check member in a proximal direction, and a solenoid actuator sleeve slidably accommodated about the exterior peripheral surface of the pilot sleeve portion of the pilot seat member, wherein the solenoid actuator sleeve comprises a cross-hole disposed in an exterior peripheral surface of the solenoid actuator sleeve and an annular groove disposed in an interior peripheral surface of the solenoid actuator sleeve, wherein the cross-hole of the solenoid actuator sleeve is fluidly coupled to the second port of the valve, and wherein: when the valve is unactuated: (i) the cross-hole of the solenoid actuator sleeve is aligned with the cross-hole of the pilot sleeve portion, and (ii) the annular groove fluidly couples the second channel to the first channel to enable generation of pilot flow from the first port to the second port when the fluid force overcomes the biasing force and the pilot check member is unseated, and when the valve is actuated, the solenoid actuator sleeve and the annular groove move axially, thereby causing the second channel to be fluidly decoupled from the first channel and precluding pilot flow from the first port to the second port.

14. The hydraulic system of claim 13, wherein the first channel is a first radial channel and the second channel is a second radial channel axially spaced apart from the first radial channel, wherein when the valve is unactuated: (i) the annular groove forms an axially extending flow passage that overlaps, at least partially, the first radial channel and the second radial channel of the pilot seat member to fluidly couple the second radial channel to the first radial channel, such that when the fluid force overcomes the biasing force of the setting spring on the pilot check member, the pilot check member is unseated and a pilot flow path is formed to allow pilot flow from the first port to the second port through the first radial channel, the annular groove, the second radial channel, the cross-hole of the pilot sleeve portion, and the cross-hole the solenoid actuator sleeve, thereby causing a piston to move axially and open a main flow path from the first port to the second port to relieve fluid from the first port to the second port, and when the valve is actuated, the annular groove moves out of alignment with the first radial channel, thereby causing the second radial channel to be fluidly decoupled from the first radial channel, blocking the first radial channel, and precluding pilot flow from the first port to the second port.

15. The hydraulic system of claim 13, wherein the valve further comprises:

a housing having a longitudinal cylindrical cavity therein and having a cross-hole disposed in an exterior peripheral surface of the housing;

a main sleeve disposed, at least partially, in the longitudinal cylindrical cavity of the housing, wherein the main sleeve includes the first port at a distal end of the main sleeve and includes one or more cross-holes disposed on an exterior peripheral surface of the main sleeve, wherein the cross-hole of the housing and the one or more cross-holes of the main sleeve form the second port; and a piston disposed within the main sleeve and configured to be axially movable therein, wherein the piston comprises a main chamber therein, and wherein the main chamber is fluidly coupled to the first port and the first channel of the pilot seat member.

16. The hydraulic system of claim 15, wherein the first channel is a first radial channel and the second channel is a second radial channel axially spaced apart from the first radial channel, and wherein the pilot seat member further comprises: (i) a first longitudinal channel fluidly coupled to the main chamber and the first radial channel, and (ii) a second longitudinal channel fluidly coupled to the second radial channel, wherein the pilot seat is formed at a proximal end of the second longitudinal channel, wherein:

when the valve is unactuated and when the fluid force overcomes the biasing force of the setting spring on the pilot check member, the pilot check member is unseated and a pilot flow path is formed to allow pilot flow from the first port to the second port, wherein the pilot flow path comprises: the first longitudinal channel, the first radial channel, the annular groove, the second radial channel, the second longitudinal channel, the cross-hole of the pilot sleeve portion, and the cross-hole of the solenoid actuator sleeve.

17. The hydraulic system of claim 13, further comprising:

a solenoid actuator comprising (i) a solenoid coil, (ii) a pole piece, (iii) an armature that is mechanically coupled to the solenoid actuator sleeve such that when the solenoid coil is energized, the armature and the solenoid actuator sleeve coupled thereto are pulled axially toward the pole piece, thereby moving the annular groove out of alignment with the first channel, and (iv) a solenoid tube, wherein the solenoid tube comprises: (i) a cylindrical body, (ii) a first chamber defined within the cylindrical body and configured to receive the armature of the solenoid actuator therein, and (iii) a second chamber defined within the cylindrical body, wherein the pole piece is formed as a protrusion from an interior peripheral surface of the cylindrical body, wherein the pole piece is disposed between the first chamber and the second chamber, and wherein the pole piece defines a channel therethrough, such that the channel fluidly couples the first chamber to the second chamber; and a manual adjustment actuator having: (i) an adjustment piston disposed, at least partially, in the second chamber of the solenoid tube, (ii) a pin disposed through the channel of the pole piece and through the armature, wherein a proximal end of the pin contacts the adjustment piston and a distal end of the pin is coupled to a spring cap against which a proximal end of the setting spring rests, such that axial motion of the adjustment piston causes the pin and the spring cap coupled thereto to move axially, thereby adjusting the biasing force of the setting spring.

18. A valve comprising:

a housing having a longitudinal cylindrical cavity therein and having a cross-hole disposed in an exterior peripheral surface of the housing;

a main sleeve disposed, at least partially, in the longitudinal cylindrical cavity of the housing, wherein the main sleeve includes a first port at a distal end of the main sleeve and includes one or more cross-holes disposed on an exterior peripheral surface of the main sleeve, wherein the cross-hole of the housing and the one or more cross-holes of the main sleeve form a second port;

a piston disposed within the main sleeve and configured to be axially movable therein, wherein the piston comprises a main chamber therein, and wherein the main chamber is fluidly coupled to the first port via an orifice;

a pilot seat member comprising: (i) a first channel and a second channel, wherein the first channel is fluidly coupled to the first port, (ii) a pilot seat, and (iii) a pilot sleeve portion comprising a pilot chamber and a cross-hole disposed in an exterior peripheral surface of the pilot sleeve portion;

a pilot check member disposed in the pilot chamber and subjected to a biasing force of a setting spring disposed in the pilot chamber, wherein the biasing force acts in a distal direction to seat the pilot check member at the pilot seat, wherein the pilot check member is configured to be subjected to fluid force of fluid in the second channel of the pilot seat member acting on the pilot check member in a proximal direction; and a solenoid actuator sleeve slidably accommodated about the exterior peripheral surface of the pilot sleeve portion of the pilot seat member, wherein the solenoid actuator sleeve comprises a cross-hole disposed in an exterior peripheral surface of the solenoid actuator sleeve and an annular groove disposed in an interior peripheral surface of the solenoid actuator sleeve, wherein the cross-hole of the solenoid actuator sleeve is fluidly coupled to the second port of the valve, and wherein the annular groove is configured to selectively fluidly couple the first channel to the second channel based on a position of the solenoid actuator sleeve.

19. The valve of claim 18, wherein the first channel is a first radial channel and the second channel is a second radial channel axially spaced apart from the first radial channel, wherein when the valve is unactuated: (i) the annular groove forms an axially extending flow passage that overlaps, at least partially, the first radial channel and the second radial channel of the pilot seat member to fluidly couple the second radial channel to the first radial channel, such that when the fluid force overcomes the biasing force of the setting spring on the pilot check member, the pilot check member is unseated and a pilot flow path is formed to allow pilot flow from the first port to the second port through the first radial channel, the annular groove, the second radial channel, the cross-hole of the pilot sleeve portion, and the cross-hole the solenoid actuator sleeve, thereby causing the piston to move axially and open a main flow path from the first port to the second port to relieve fluid from the first port to the second port.

20. The valve of claim 19, when the valve is actuated, the annular groove moves out of alignment with the first radial channel, thereby causing the second radial channel to be fluidly decoupled from the first radial channel, blocking the first radial channel, and precluding pilot flow from the first port to the second port.

* * * * *